United States Patent Office 3,114,600
Patented Dec. 17, 1963

3,114,600
PROCESS FOR RECOVERY OF HAFNIUM VALUES FROM CRUDE POTASSIUM FLUOHAFNATE SOLUTIONS
Martin A. Hobin, Cincinnati, and Raymond A. Foos, Loveland, Ohio, assignors to National Distillers and Chemical Corporation, New York, N.Y., a corporation of Virginia
No Drawing. Filed Sept. 1, 1959, Ser. No. 837,337
5 Claims. (Cl. 23—24)

This invention relates to a novel method for the recovery of hafnium values from hafnium-containing solutions. More particularly, the invention pertains to the preparation of such purified compounds as potassium fluooxyhafnate, potassium hafnate, potassium fluohafnate and hafnium oxide.

In a recently proposed process, hafnium values have been recovered from crude sources by dissolution in hydrofluoric acid followed by crystallization of potassium fluohafnate, $K_2HfF_6$, from the resulting solution by addition thereto of a potassium-containing compound such as potassium fluoride. The potassium fluohafnate crystals are recovered from the reaction mixture by filtration, and subjected to a second crystallization procedure if high purity salt product is desired. With respect to the first crystallization step, however, it was found that the solution or filtrate remaining after separation of the potassium fluohafnate by filtration contained a significant percentage of hafnium. Consequently, the recovery or re-use of this material would be important in the over-all economics of the process. The percentage of hafnium, as potassium fluohafnate, in the solution may vary from about 5 to 15%, although the exact amount or the source of the hafnium is not critical for the purposes of this invention. In addition to the hafnium constituents, the solution also contains a high percentage of impurities such as aluminum, iron, magnesium, manganese, silicon, titanium, etc. The presence of these impurities in substantial amounts militates against the direct recycling of this solution to the dissolution or crystallization steps, since such practice would lead to an undesirable build-up of the metallic impurities in the system. Obviously it is important to devise some other method for recovering the hafnium values from this particular solution.

One object of this invention is to provide a method for effectively recovering the hafnium values from the solution or filtrate obtained during the crystallization of the potassium fluohafnate. Another object of the invention is to provide a process whereby the metal impurities present in the feed solution are substantially removed from the hafnium constituents. Other objects of the invention will become apparent from the ensuing description.

The preferred process of this invention comprises the following steps: (1) addition of potassium hydroxide to the filtrate or solution from the above described process until a pH of about 3.5 to 8 is attained, (2) filtration of the insoluble material from the resulting solution, (3) addition of further amounts of potassium hydroxide to the solution until a pH of about 8.5 to 10 is attained, and (4) recovery of the resulting precipitated potassium hafnium oxyfluoride or potassium fluooxyhafnate precipitate from the reaction product mixture. The reaction which takes place in the first hydrolysis step is believed to be as follows:

$$K_2HfF_6 + KOH \rightarrow K_2HfOF_4 \cdot HF + KF$$

In the second hydrolysis step, insoluble potassium hafnium oxyfluoride is produced by the following reaction:

$$K_2HfOF_4 \cdot HF + KOH \rightarrow KHfOF_3 + 2KF + H_2O$$

In accordance with another aspect of this invention, it was found that the addition of more potassium hydroxide results in the production of purified potassium hafnate. The reaction is as follows:

$$KHfOF_3 + 4KOH \rightarrow K_2HfO_3 + 3KF + 2H_2O$$

In the presence of water and sufficient potassium hydroxide to obtain a reaction mixture having a pH within the range of about 12 to 14, hydrated hafnium oxide will be obtained as follows:

$$K_2HfO_3 + H_2O \rightarrow HfO_2(hydrate) + 2KOH$$

Another possible purification method involves acidifying the $K_2HfOF_4$ solution (or the $KHfOF_3$ precipitate) with hydrofluoric acid to give a pH of less than about 1. The resulting solution is cooled to obtain crystallization of purified potassium fluohafnate.

For the purposes of a more detailed description of the present invention, each of the foregoing process steps will be discussed in detail hereinafter.

As previously noted, the potassium fluohafnate solution employed as the feed material in the instant process is derived from the process wherein purified potassium fluohafnate is precipitated or crystallized from a crude hafnium-containing material which had been dissolved in hydrofluoric acid. The details of that process are set forth in U.S. application S.N. 837,356, filed September 1, 1959, by M. A. Hobin and R. A. Foos. It will be understood, however, that the exact method of preparing or recovering the feed material used in this process does not constitute an essential feature of the instant invention. For example, a commercial hafnium concentrate could be dissolved in hydrofluoric acid to obtain such a hafnium concentration that the addition of potassium fluoride or an equivalent potassium-containing compound did not precipitate the potassium fluohafnate at the temperatures employed. The amount of potassium hexafluohafnate in the feed solution will generally be at least about 5%; although, as noted above, the percentage of the double halide salt in the feed is not critical.

In practicing the process of the invention, potassium hydroxide is added to the feed solution, in which hafnium is present as a potassium fluosalt, while maintaining a temperature of about 60° to 100° C., preferably about 75° to 85° C. Sufficient potassium hydroxide is added to obtain a pH within the range of about 3.5 to 8, preferably about 5.5 to 7.5, in the reaction mixture. Under these conditions the major amount of metal impurities, with the exception of titanium, precipitate as their hydroxides or oxyfluorides. Approximately 0.5 to 5.0% of the hafnium will also precipitate, whereas the remainder will remain in solution as potassium hafnium oxyfluoride. The potassium hydroxide employed in this particular step as well as in the subsequent treatment may be either solid particles or aqueous solutions thereof.

After the reaction has been completed, the resulting reaction mixture is filtered by conventional means to remove the insoluble reaction products. The filtration will be carried out at temperatures within the range of about 60° to 80° C. As noted above, the insoluble material will comprise a high percentage of the metallic impurities in the form of their hydroxides or oxyfluorides. The results achieved in this step are shown in Table A, which sets forth the analyses of the insoluble oxides recovered from the feed solution at various pH's.

TABLE A

| Component[1] | $K_2HfF_6$ Feed | pH 3.5 | pH 5.5 | pH 6.0 | pH 6.5 | pH 7.0 |
|---|---|---|---|---|---|---|
| Aluminum | 600 p.p.m. | 1-10 | 1-10 | 1-10 | 0.5-5 | 0.5-5 |
| Iron | 7,500 p.p.m. | >10 | >1.10 | >1.0 | 1-10 | 1-10 |
| Magnesium | 1,000 p.p.m. | 1.0 | 1.0 | 1.0 | 0.1-1.0 | 0.1-1.0 |
| Tin | 25 p.p.m. | .005-0.5 | .005-.05 | .005-0.5 | .005-.05 | .005-.05 |
| Chromium | 90 p.p.m. | .01-01 | .01-.1 | .01-.1 | .01-.1 | .01-.1 |
| Manganese | 50 p.p.m. | .005-.05 | .005-.05 | .005-0.5 | .005-.05 | .005-.05 |
| Nickel | 20 p.p.m. | N.D. | [2] N.D. | N.D. | N.D. | N.D. |
| Lead | 225 p.p.m. | 0.1-1.0 | 0.1-1.0 | 0.1-1.0 | 0.1-1.0 | 0.1-1.0 |
| Silicon | .1-1%. | 1-10 | 1-10 | 1-10 | 0.5-5 | 0.5-5 |
| Titanium | 250 p.p.m. | .1-1 | 1.-1 | .1-1 | .1-1 | 0.1-1 |
| Sodium | | >10 | >10 | >10 | 1-10 | 1-10 |
| Hafnium | | 1-5 | 1-10 | 1-10 | >10 | >10 |
| Zirconium | | | <.1 | >.1 | .1-1 | .1-1 |

[1] percent unless otherwise indicated.
[2] N.D.=not detected, less than .01%.

The percentages of hafnium, based on total hafnium in process, and impurities found in the insoluble material at 70° C. in various runs are set forth in the following table:

TABLE B

| | pH 3 | pH 5.5 | pH 6 | pH 6.5 | pH 7 | pH 8 | pH 9 |
|---|---|---|---|---|---|---|---|
| Total percent of Hafnium | <0.5 | 0.7 | 0.6 | 2.8 | 2.8 | 40 | >90 |

The filtrate or mother liquor recovered from the above filtration step is then treated by adding thereto potassium hydroxide in sufficient amount to raise the pH thereof to about 8 to 12, and preferably about 8.5 to 10. The temperature of the reaction mixture is maintained within a range of about 60° to 80° C. After the reaction is completed, less than about 15 minutes, a precipitate comprising purified potassium hafnium oxyfluoride ($KHfOF_3$) is recovered from the resulting reaction product mixture by conventional filtration or other means. The titanium impurity, the content of which in the filtrate or mother liquor exceeds specification levels thereby preventing direct re-use, is converted to soluble potassium titanate ($K_2TiO_3$); and is, consequently, removed from the system by discarding the filtrate. Analysis of the hafnium product in the filtrates obtained at varying pH levels are shown below:

TABLE C

| Component[1] | pH 3.5 | pH 5.5 | pH 6 | pH 6.5 | pH 7 |
|---|---|---|---|---|---|
| Aluminum | 75 | 60 | 25 | 30 | 15 |
| Iron | 700 | 650 | 500 | 235 | 70 |
| Magnesium | 100 | 85 | 40 | 20 | 12 |
| Nickel | 20 | 10 | <10 | <10 | |
| Tin | 20 | 7 | <5 | <5 | <5 |
| Chromium | 40 | 23 | 15 | 15 | 15 |
| Manganese | 50 | <5 | <5 | <5 | <5 |
| Lead | <10 | 15 | <10 | <10 | <10 |
| Silicon | 240 | 230 | 250 | 250 | 15 |
| Cadmium | <.5 | <.5 | <.5 | <.5 | <.1 |
| Cobalt | | <5 | <5 | <5 | <5 |
| Titanium | 250 | 250 | 250 | 250 | 220 |

[1] Parts per million.

The above data show that the process of this invention can be readily employed for the preparation of purified potassium hafnium oxyfluoride, having metallic impurities reduced below conventional commercial specification limits. The potassium hafnium oxyfluoride so obtained can be re-used in the process of Hobin and Foos, supra, for preparing $K_2HfF_6$. In addition, high purity hafnium oxide prepared from the same can be used for the preparation of high purity hafnium chemicals, high neutron cross section ceramics, high qulity hafnium refractories such as carbides, silicides, etc.

The invention will be more fully understood by reference to the following illustrative example.

*Example I*

100 g. of impure potassium fluohafnate (94% $K_2HfF_6$) was dissolved in 1 l. of warm water (40–50° C.). The solution was heated to 75–80° C. and the pH adjusted to pH 7 with 10% KOH solution using pH ion paper as the indicator. A small amount of brown fluocculent material gradually precipitated. After digesion for 20–30 minutes, the insolubles were filtered from the solution at 70–75° C. The precipitate weighed 8.5 g. after drying at 110° C. KOH solution (50%) was added to the solution at 70° C. This elevated the pH of the solution to 9 whereupon an insoluble precipitate was filtered off. After drying, the resulting $KHfOF_3$ weighed 64.5 g., a recovery of 85% of the hafnium. The filtrate containing impurities and only a trace of hafnium was discarded.

The analyses of the feed materials, on a hafnium basis, as well as the various fractions obtained in carrying out the above-described process are set forth below:

TABLE D

| Component | $K_2HfF_6$ Feed | Insolubles | $K_2HfOF_4$ Solution | $KHfOF_3$ Precip. |
|---|---|---|---|---|
| Aluminum | >500 p.p.m. | .5-5% | 25 p.p.m. | 20 p.p.m. |
| Iron | >1% | 1-10% | 235 p.p.m. | 235 p.p.m. |
| Magnesium | >100 p.p.m. | .01-.1% | 15 p.p.m. | 12 p.p.m. |
| Tin | 15 p.p.m. | .005-.05% | 10 p.p.m. | <5 p.p.m. |
| Chromium | 45 p.p.m. | .01-.1% | 20 p.p.m. | 18 p.p.m. |
| Manganese | 20 p.p.m. | .035-.05% | 15 p.p.m. | <5 p.p.m. |
| Nickel | 20 p.p.m. | | <10 p.p.m. | <10 p.p.m. |
| Lead | 225 p.p.m. | .01-1.0% | 25 p.p.m. | <10 p.p.m. |
| Silicon | 200 p.p.m. | .5-5% | 10 p.p.m. | 15 p.p.m. |
| Molybdenum | 10 p.p.m. | | | <5 p.p.m. |
| Titanium | 260 p.p.m. | 0.1-1.0% | 200 p.p.m. | 70 p.p.m. |
| Vanadium | 19 p.p.m. | N.D. | | <10 p.p.m. |
| Zirconium | .1-1% | .1-1% | 0.1-1% | .1-1% |

As indicated above, one of the essential features of the present invention is the addition of the potassium hydroxide to potassium-bearing hafnium solutions. In the following example, the use of an $H_2HfF_6$ solution in the process resulted in the precipitation of a major proportion of the hafnium along with the metal impurities.

*Example II*

To 500 ml. of $H_2HfF_6$ solution containing 74 g.p.l. of $HfO_2$ and with a pH of <1 was added KOH pellets at 70° C. As the pH of the solution approached 1.5, appreciable quantities of the material rich in hafnium were precipitated. Increase of the pH to 5–5.5 with KOH gave precipitation of >75% of the hafnium at 70° C. This test indicates that KOH must be added to potassium-bearing hafnium solutions for high yields of pure product.

While particular embodiments of this invention are shown above, it will be understood that the invention is

What is claimed is:

1. A process for the recovery of hafnium values from a crude potassium fluohafnate solution containing metallic impurities which comprises adding sufficient potassium hydroxide to said crude solution to obtain a pH within the range of about 3.5 to 8 while maintaining a temperature of about 60° to 100° C., filtering the resulting solution at a temperature of about 60° to 80° C. to remove insoluble material and to recover a filtrate, adding additional potassium hydroxide to said filtrate to obtain a pH within the range of about 8 to 12 to precipitate purified potassium hafnium oxyfluoride, and recovering said purified potassium hafnium oxyfluoride.

2. The process of claim 1 wherein sufficient potassium hydroxide is added to said crude solution to obtain a pH within the range of about 5.5 to 7.5.

3. The process of claim 1 wherein sufficient potassium hydroxide is added to said filtrate to obtain a pH within the range of about 8.5 to 10.

4. A process for the recovery of hafnium values from a crude potassium fluohafnate solution containing metallic impurities which comprises adding sufficient potassium hydroxide to said crude solution to obtain a pH within the range of about 5.5 to 7.5 while maintaining a temperature of about 60° to 100° C., filtering the resulting solution at a temperature of about 60° to 80° C. to remove insoluble material and to obtain a filtrate, adding additional potassium hydroxide to said filtrate to obtain a pH within the range of about 8.5 to 10 while maintaining a temperature of about 60° to 80° C. to precipitate purified potassium hafnium oxyfluoride, and recovering said purified potassium hafnium oxyfluoride.

5. The process of claim 4 wherein said purified potassium hafnium oxyfluoride is recovered by filtration.

References Cited in the file of this patent

UNITED STATES PATENTS

| | | |
|---|---|---|
| 1,618,960 | Coster et al. | Feb. 22, 1927 |
| 2,859,098 | Ruhoff et al. | Nov. 4, 1958 |
| 2,888,319 | Gloss | May 26, 1959 |
| 2,895,792 | Ruhoff et al. | July 21, 1959 |